United States Patent [19]

de Echeandia et al.

[11] 4,262,708

[45] Apr. 21, 1981

[54] METHOD AND APPARATUS FOR TREATING FLEXIBLE CONTAINERS

[75] Inventors: Rafael A. de Echeandia, Chester; James L. Hutcheson, Mechanicsville, both of Va.

[73] Assignee: Reynolds Metals Company, Richmond, Va.

[21] Appl. No.: 75,801

[22] Filed: Sep. 14, 1979

[51] Int. Cl.³ .............................................. B65B 31/06
[52] U.S. Cl. ........................................... 141/7; 34/21; 34/104; 53/434; 53/512; 141/10; 141/91
[58] Field of Search ............. 34/104, 21; 53/434, 53/512; 239/549; 141/7, 8, 9, 10, 11, 69, 70, 82, 85, 89–92, 100, 285, 392

[56] References Cited

U.S. PATENT DOCUMENTS

| | | | |
|---|---|---|---|
| 3,140,571 | 7/1964 | Dorper et al. | 53/477 |
| 3,333,391 | 8/1967 | Horeth et al. | 53/450 |
| 3,432,982 | 3/1969 | Brinkmeier et al. | 53/415 |
| 3,488,910 | 1/1970 | Stoger et al. | 53/415 |
| 3,592,575 | 7/1971 | Hurst | 239/549 X |
| 3,673,041 | 6/1972 | Schulz et al. | 156/306 |
| 3,825,408 | 7/1974 | Farfaglia | 34/104 X |
| 3,953,272 | 4/1976 | Webber | 156/152 |
| 4,016,705 | 4/1977 | Wilson et al. | 53/407 |
| 4,027,456 | 6/1977 | Wilson | 53/434 |
| 4,140,159 | 2/1979 | Domke | 141/70 X |

Primary Examiner—Frederick R. Schmidt
Attorney, Agent, or Firm—Glenn, Lyne, Girard & McDonald

[57] ABSTRACT

A method and apparatus are disclosed for treating flexible pouch-like containers prior to heat sealing of the containers. The method comprises simultaneously injecting superheated steam into a filled container to evacuate air from the container and directing pressurized steam at the inside edge of the container which is to be heat sealed to remove contaminants from this region. Optionally, the method of the present invention may also include a simultaneous directing of steam under pressure to the outside edge of the container in the heat sealing region to enhance the cleaning operation. The apparatus for accomplishing this result comprises a nozzle having a first chamber through which steam may be injected into the container and a second chamber having a plurality of openings through which steam under pressure may be directed against the inside walls of the container from a line supplying the pressurized steam. Optionally, the nozzle may include a third chamber in fluid-flow connection with the pressurized steam line having a plurality of openings therein for directing pressurized steam at the outside edge of the container.

6 Claims, 2 Drawing Figures

METHOD AND APPARATUS FOR TREATING FLEXIBLE CONTAINERS

BACKGROUND OF THE INVENTION

Numerous materials are packaged in flexible containers, such as flexible pouch-like containers. Such pouches may be formed from pairs of webs which are heat sealed to one another, or the pouch may be formed of a single web which is folded, with the side seams and top seam, and optionally the folded bottom edge, being heat sealed. Such pouch-like containers may be fabricated from thermoplastic resins or laminates including inner heat-sealable layers fabricated from thermoplastic resins. Thus, pouches are commonly formed from a pair of lamina in which each lamina comprises an outer layer of a plastics resin film, a central barrier layer of a metal foil, such as aluminum foil, and an inner layer of a heat-sealable thermoplastic resin film or from folded webs of these sheet materials.

In filling and sealing pouches with foodstuffs and the like, contamination of the top edge region of the pouch, which is the area where the final seal is to be formed, is a continuing problem. Quite often, solid food particles will cling to the walls of the pouch in the edge region where this heat seal is to be located. This contamination requires that the region to be heat sealed be cleaned of food particles prior to sealing, since these particles will interfere with the heat sealing operation, causing gaps, blisters, blemishes or other defects in the heat seal and possible failure in the seal. Such cleaning has in the past been accomplished by means of pressurized steam.

In order to partially remove air from such containers prior to sealing thereof, steam has in the past been injected into the containers prior to sealing. It has, heretofore, been the practice to either inject steam into a container for air removal purposes or to direct pressurized steam for cleaning purposes. It has been unknown to simultaneously treat flexible containers by injecting steam and directing pressurized steam to accomplish both of these purposes. It is thus a primary aspect of the present invention to enable these two results to be accomplished at a single forming station.

It has also been found that, with such materials as gravy and other liquid and semi-liquid foodstuffs, these materials can accumulate on the outside of the container, especially at the top edge region of the container. This interferes with the heat sealing operation in that the foodstuffs on the outside of the container quickly transfer to the heated bars which are used for sealing of the containers, resulting in reduced heat transfer rates for the heated bars and thus increased down time for cleaning and/or replacement of protective covers for these heated bars. It is thus an additional objective of the present invention to cleanse both the inner and outer edge of the container prior to heat sealing thereof.

THE PRESENT INVENTION

The method and apparatus of the present invention produce all of these desired results. The apparatus of the present invention comprises a steam injection and cleaning nozzle having a pair of steam chambers. The first chamber directs steam in a generally vertical direction into the flexible container to remove air from the container and the second chamber includes a plurality of openings therein through which pressurized steam is directed from a pressurized steam line in a generally horizontal direction against the inside edge of the container to clean this area. In an optional, and preferred, embodiment, a third chamber is connected in fluid-flow relation with the pressurized steam line, with the third chamber having a plurality of openings positioned and arranged to direct pressurized steam against the outside edge of the container to clean this region. The method of the present invention comprises simultaneously removing air from and cleansing the edge of the container by directing steam in a generally vertical direction into the container while directing pressurized steam in a generally horizontal direction at the inside edge of the container. Optionally, the method may further comprise simultaneously directing pressurized steam in a generally horizontal direction at the outside edge of the container to cleanse this area. Employment of the method and apparatus of the present invention provides a hermetically sealed flexible container which can be heat sealed without defects in the seal.

BRIEF DESCRIPTION OF THE DRAWINGS

The method and apparatus of the present invention will be more fully described with reference to the drawings in which.

DETAILED DESCRIPTION OF THE PREFERRED EMBODIMENTS

Figure 1:
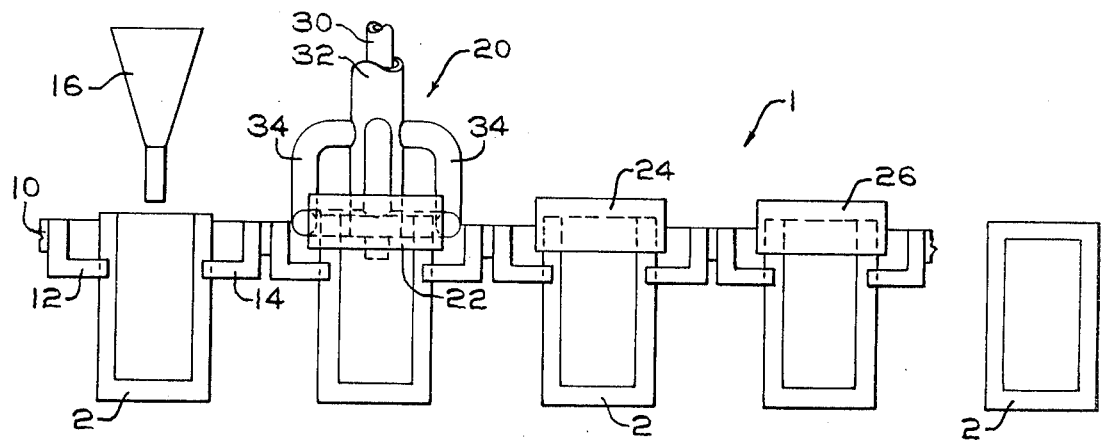
FIG. 1 is a schematic view of a flexible pouch filling and sealing line employing the method and apparatus of the present invention.

Turning to FIG. 1, a flexible pouch filling and sealing line 1 is illustrated. This line 1 may be a line employing pre-formed pouches 2 as its supply, or the line 1 may include means for forming the pouches 2 from a roll of pouch sheet stock. A typical line 1 for forming, filling and sealing pouches, which may be employed in the practice of the present invention, is an Bartelt IMR Intermittent Motion Flexible Pouch Packager, produced by Rexham Corporation. Since whether the pouches 2 are pre-formed or formed in the filling and sealing apparatus 1 from sheet stock is unimportant to the practice of the present invention, this pouch forming operation is not illustrated in FIG. 1. Thus, FIG. 1 illustrates the operation from the filling of the pouches 2.

Each pouch 2 is held, as it is positioned from station to station, by means of a pair of grippers 12 and 14. These grippers 12 and 14 are attached to means 10 for positioning the grippers 12 and 14 and the pouch 2 carried therebetween from station to station intermittently. The means 10 may be a chain, belt or the like, and is preferably a chain. This chain 10 is connected to motor means and timing means (not shown) for intermittently moving the chain 10, the grippers 12 and 14 and the pouch 2 from station to station.

The first station illustrated in FIG. 1 is a filling station. The product 4 to be packaged within the pouch 2 is fed to the pouch 2 by means of a filling means 16. If two or more separate products are to be fed to the pouch 2, such as, for example, meat chunks and gravy, multiple filling stations, each employing a filling means 16, may be used.

The second station illustrated is the air removal and cleaning station which embodies the method and apparatus of the present invention. At this station the pouch 2 is positioned between a pair of heated bars 22 in their open position. A nozzle 20 is lowered over the pouch 2 and the air removal and cleansing operations, to be more fully described below, are accomplished. The nozzle 20 is then raised and the heated bars 22 are closed. The heated bars 22 may fully close upon the pouch 2 to heat seal it or, as illustrated, the pouch may then pass to a second pair of heated bars 24 and a pair of chilled bars 26 where the pouch 2 is finally sealed. The method for sealing such pouch-like flexible containers by means of heated bars which do not fully close upon the pouch 2 and chill bars 26 which apply sealing pressure and cooling to the pouch 2 to finally seal it is more fully described in concurrently filed and co-pending U.S. application Ser. No. 75,844, which is assigned to the assignee of the present invention and the disclosure of which is hereby incorporated herein by reference.

Figure 2:
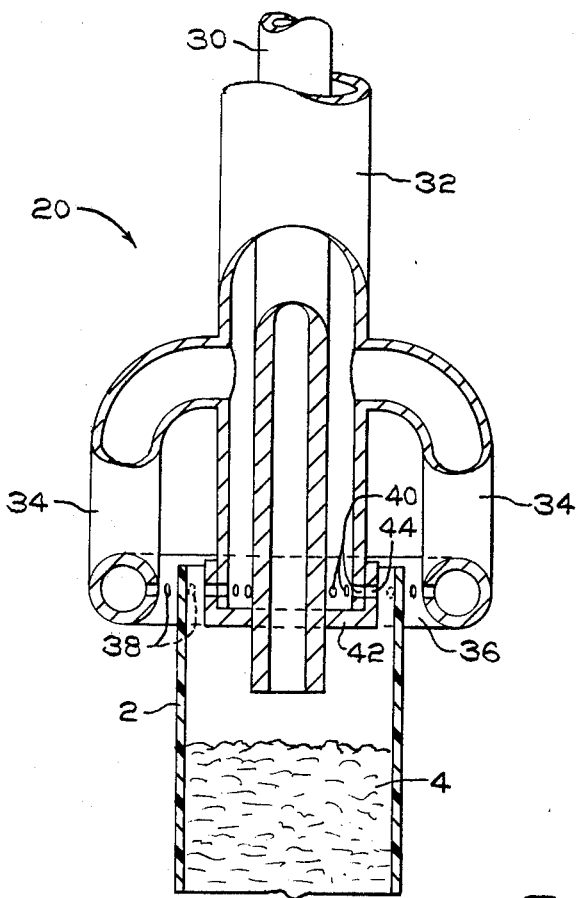
FIG. 2 is a partial cross-sectional view of the nozzle apparatus employed in the practice of the preferred embodiment of the present invention.

FIG. 2 illustrates the nozzle 20 employed in the practice of the preferred embodiment of the present invention. The nozzle 20 is constructed of a material which is suitable for contact with foodstuffs and their containers. A preferred material for construction of the nozzle 20 is stainless steel.

The nozzle 20 includes a first fluid chamber 30. This chamber 30 includes an opening to direct fluid in a generally downward vertical direction. When employed in the practice of the present method, chamber 30 is connected to a source of steam (not shown), which steam is passed through chamber 30 and directed downwardly into the flexible container 2 at a temperature preferably between about 250° and 350° F. (121° and 206.5° C.) and at a pressure preferably between about 3 and 7 pounds per square inch (2109.3 and 4921.7 kilograms per square meter). Thus, in the preferred practice of the present invention, the steam employed for air removal purposes is superheated steam. This superheated steam accomplishes the partial removal of air from the pouch 2.

Chamber 30 is surrounded by a fluid line 32. Line 32 includes a plurality of openings 40. These openings are connected in fluid-flow relation to a second chamber 42, which chamber 42 is shaped to fit within the opened pouch 2 and which chamber 42 surrounds the openings 40 and otherwise seals the fluid line 32. The chamber 42 includes a plurality of openings 44 which are positioned and arranged to direct fluid from line 32 at the inside edge region of the container 2 to clean this region of food particles and/or liquid or semi-liquid materials which have adhered to the inside edge of the pouch 2. Chamber 30 passes through this chamber 42 and is held in position by this chamber 42.

In the embodiment illustrated in FIG. 2, fluid line 32 is additionally connected in fluid-flow relation to one or more feed lines 34. These feed lines 34 are also connected in fluid-flow relationship to a third outer chamber 36. Outer chamber 36 surrounds the outer edge of the pouch 2 and includes a plurality of openings 38 which are positioned and arranged to direct fluid from line 32 to the outer edge portion of the pouch 2 to clean this region. While the outer chamber 36 and its associated connecting feed lines 34 are preferred, depending upon the material to be packaged within the container 2 and thus the degree of material adhering to the container edge, it is possible to operate according to the method of the present invention with a nozzle apparatus which does not include chamber 36 and its associated connecting feed lines 34.

The fluid supplied through line 32 according to the method of the present invention is pressurized steam. The steam employed for cleaning the pouch 2 is supplied at a temperature preferably between about 212° and 275° F. (100° and 135° C.) and at a pressure preferably between about 15 and 25 pounds per square inch (10,546.5 and 17,577.5 kilograms per square meter).

After the air removal and cleansing operations have taken place by means of nozzle 20, nozzle 20 is raised and the sealing action as previously described takes place.

From the above description, it is clear that the present invention provides a method and apparatus for preparing a pouch-like flexible container for heat sealing which both provides a partial removal of air from the pouch and a pouch which may be heat sealed without defects in the seal and without damage to the sealing apparatus.

While presently preferred embodiments of the present invention have been illustrated and described, it will be understood that the invention may be otherwise variously embodied and practiced within the scope of the following claims.

We claim:

1. A nozzle apparatus for simultaneously cleaning an edge portion of and at least partially removing air from a flexible container comprising an air removal chamber having an opening for directing air removal fluid in a generally vertically downward direction into said flexible container, a first cleaning fluid line, a first cleaning chamber connected in fluid-flow relation to said first cleaning fluid line, said first cleaning chamber having a plurality of openings for directing a cleaning fluid in a generally horizontal direction against the inside edge of said flexible container, a second cleaning chamber having a plurality of openings for directing said cleaning fluid in a generally horizontal direction against the outside edge of said flexible container and at least a second cleaning fluid line contact in fluid-flow relation to said second cleaning chamber and said first cleaning fluid line.

2. The nozzle apparatus of claim 1 wherein said first cleaning chamber is connected in fluid-flow relation to said first cleaning fluid line by means of a plurality of openings in said first cleaning fluid line.

3. The nozzle apparatus of claim 1 wherein said nozzle apparatus is constructed of stainless steel.

4. A method for simultaneously cleaning an edge portion of and at least partially removing air from a flexible container prior to heat sealing thereof comprising directing superheated steam in a generally vertically downward direction into said flexible container at a pressure sufficient to at least partially remove air from within said flexible container and simultaneously directing pressurized steam in a generally horizontal direction at the inside edge and the outside edge of said flexible container at a pressure sufficient to clean said flexible container.

5. The method of claim 4 wherein said superheated steam is at a temperature between about 250° and 350° F. (121° and 206.5° C.) and at a pressure between about 3 and 7 pounds per square inch (2109.3 and 4921.7 kilograms per square meter).

6. The method of claim 5 wherein said pressurized steam is at a temperature between about 212° and 275° F. (100° and 135° C.) and at a pressure between about 15 and 25 pounds per square inch (10,546.5 and 17,577.5 kilograms per square meter).

* * * * *